United States Patent [19]

Cassel et al.

[11] Patent Number: 4,629,226
[45] Date of Patent: Dec. 16, 1986

[54] PIPE LAP JOINT WITH COLLAPSIBLE SEALING ZONE AND BAND CLAMP

[75] Inventors: Thomas R. Cassel; Scott T. Cassel, both of Birmingham, Mich.

[73] Assignee: BKS Company, Birmingham, Mich.

[21] Appl. No.: 723,910

[22] Filed: Apr. 16, 1985

[51] Int. Cl.$^4$ ............................................. F16L 13/14
[52] U.S. Cl. .................................. 285/382; 285/403; 285/420; 285/424
[58] Field of Search ............. 285/403, 382, 424, 322, 285/323, 420

[56] References Cited

U.S. PATENT DOCUMENTS

| | | | |
|---|---|---|---|
| 3,004,781 | 10/1961 | Morris | 285/420 X |
| 3,905,623 | 9/1975 | Cassel | 285/382 |
| 4,056,273 | 11/1977 | Cassel | 285/382 X |
| 4,113,289 | 9/1978 | Wagner et al. | 285/382 X |
| 4,312,526 | 1/1982 | Cassel | 285/420 X |

Primary Examiner—Dave W. Arola
Attorney, Agent, or Firm—Reising, Ethington, Barnard, Perry & Milton

[57] ABSTRACT

A pipe lap joint is disclosed with an improved sealing zone structure in the overlap region of the pipe. The sealing zone comprises a pair of end-to-end intersecting slots which are covered by a clamping band and which allow the sealing zone of the pipe to be collapsed against the inner pipe when the clamping band is tightened. The outboard slot extends inwardly from the end of the pipe and terminates in a transverse end wall within the overlap region. The inboard slot is circumferentially offset from the outboard slot and extends inwardly from an outer end wall thereof. The adjacent sidewalls of the slots are in substantial alignment with each other and the end walls are also in substantial alignment with each other whereby the end walls of the slots are disposed in edge-to-edge engagement with each other when the overlap region of the outer pipe is collapsed into close fitting engagement with the inner pipe.

5 Claims, 5 Drawing Figures

4,629,226

PIPE LAP JOINT WITH COLLAPSIBLE SEALING ZONE AND BAND CLAMP

FIELD OF THE INVENTION

This invention relates to pipe couplings and more particularly, it relates to a pipe lap joint especially adapted for use in vehicle exhaust systems.

BACKGROUND OF THE INVENTION

In certain applications, especially in vehicle exhaust systems, it is desired to provide a pipe joint with a high pull apart strength and a good fluid seal between the pipes. This has been provided by a wide band clamp of the type in which the band is stretched over a butt joint with tight engagement against both pipes. This pipe coupling is disclosed in the Cassel U.S. Pat. No. 3,905,623 granted Sept. 16, 1975. This patent also dislcoses a lap joint in which the outer pipe serves as a clamping sleeve and receives the end of the other pipe in overlapping relationship. Force applying means are provided on the clamping sleeve to stretch the sleeve into tight engagement with the inner pipe.

A pipe coupling with a lap joint for exhaust systems with high pull-apart strength and good fluid sealing is also disclosed in the Cassel U.S. Pat. No. 4,056,273 granted Nov. 1, 1977. The coupling disclosed in this patent comprises a wide band clamp with a sealing ring disposed around the inner pipe and having an outer diameter about the same as that of the outer pipe. the wide band clamp covers the sealing ring and the end of the outer pipe, spanning the junction therebetween, and is stretched into tight engagement against the sealing ring and the outer pipe.

Another pipe coupling for lap joints with high pull-apart strength and good fluid sealing is disclosed in Cassel U.S. Pat. No. 4,312,527 granted Jan. 26, 1982. The coupling disclosed in this patent comprises an open sleeve which is stretched around the pipes. The open sleeve comprises a roundish sector and a channel-shaped sector comprising a pair of sidewalls extending radially outwardly from the roundish sector. Force applying means are connected with the sidewalls to draw them together so that the roundish sector of the sleeve is stretched over the pipes.

In certain applications in vehicle exhaust systems, it is desired to provide a pipe coupling of the lap type in which a fluid tight seal is provided with a clamping sleeve or band which engages the outer pipe only, i.e. which does not span the outer pipe and inner pipe. In such a pipe lap joint, the fluid seal is achieved by using an outer pipe with a collapsible sealing ring or zone at its free end which is collapsed into sealing engagement with the inner pipe by tightening a clamping band thereon. A pipe lap joint of this type is disclosed in the Wagner et al U.S. Pat. No. 4,113,289 granted Sept. 12, 1978.

The collapsible sealing zone in the Wagner et al patent comprises several sets of slots which are disposed circumferentially around the end of the outer pipe. In each set of slots, there is an open slot which extends inwardly from the end of the pipe and an adjacent closed slot, i.e. it does not extend to the end of the pipe. One difficulty with this sealing zone is that the slot structure exhibits a relatively high resistance to collapsing and accommodates a relatively small amount of reduction in the circumference of the pipe at each set of slots. A lap joint of the type using a collapsible sealing zone is also disclosed in the aformentioned Cassel U.S. Pat. No. 4,056,273 wherein a collapsible sealing ring forms an extension of the outer pipe but is separate therefrom. This sealing ring is split so as to form a tongue on each free end with the tongues having complementary ramp surfaces in engagement with each other and which slide relative to each other when the ring is contracted or collapsed. This sealing ring provides a good seal but the structure is not adapted to a sealing ring which is integral with the pipe end. One difficulty is that it requires a shearing operation which results in bending in the region of the shear line and then requires reforming the pipe end.

A general object of this invention is to overcome certain disadvantages of the prior art and to provide an improved pipe lap joint.

SUMMARY OF THE INVENTION

In accordance with this invention, an improved pipe lap joint is provided which exhibits high pull apart strength, good fluid sealing and which is economical to manufacture.

Further, in accordance with this invention, an improved pipe lap joint is provided in which the overlap region of the outside pipe comprises a collapsible sealing zone with at least one pair of intersecting end-to-end slots which afford relief for circumferential contraction with of sealing zone. A clamping band is disposed around the outside pipe and covers the inboard slot. Tightening means are provided for clamping the band around the outside pipe to clamp the pipes together and collapse the sealing zone of the outer pipe into close fitting engagement with the inner pipe to cause sealing engagement of the outer pipe with the inner pipe and with the band.

Further, in accordance with this invention, the intersecting slots comprise an outboard slot with sidewalls extending inwardly from the end of the outside pipe and terminating in a transverse inner end wall within the overlap region, and an inboard slot circumferentially offset from the outboard slot with sidewalls extending axially inwardly from an outer end wall, the adjacent sidewalls of the slots being in substantial alignment with each other and the end walls being in substantial alignment with each other.

A more complete understanding of this invention may be obtained from the detailed description that follows taken with the accompanying drawings.

BEST MODE FOR CARRYING OUT THE INVENTION

Figure 1:
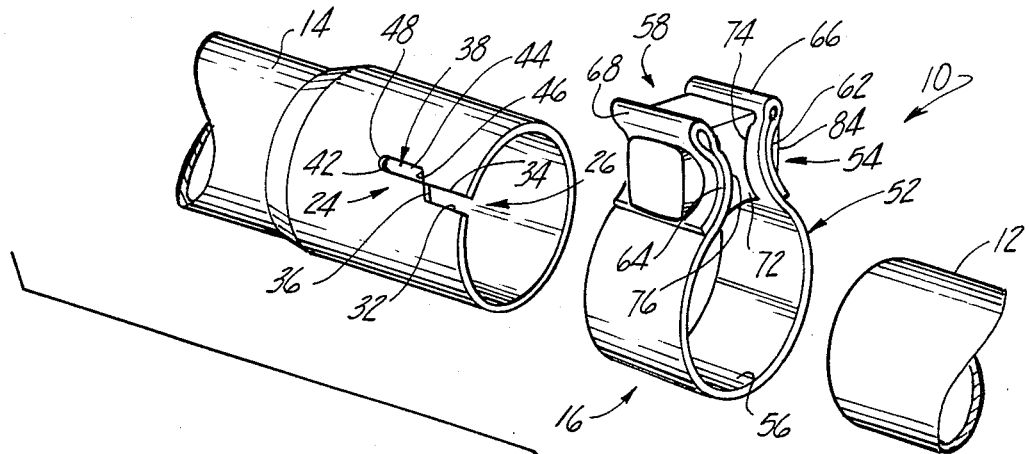
FIG. 1 is an exploded view of the lap joint of this invention showing the parts before they are assembled.

Referring now to the drawings, there is shown an illustrative embodiment of the invention in a pipe lap joint which is especially adapted for use in vehicle exhaust systems. It will be appreciated as the description proceeds that the invention is useful in other embodiments and other applications.

As shown in the drawings, the pipe joint 10 of this invention comprises, in general, inside and outside pipes 12 and 14, respectively, in a telescoping relationship with a band clamp 16 for holding the pipe together. The outside pipe 14 has a lap portion which extends over the inside pipe 12 to provide an overlap region 18 of the pipes. In order to provide a fluid seal between the inside and outside pipes, a radially collapsible sealing zone 22 is provided on the outise pipe 14 in the overlap region 18. The collapsible sealing zone 22 will be described in detail presently.

The sealing zone 22 comprises a ring shaped portion of the free end of the outside pipe 14. It is adapted to be contracted or collapsed in the radial direction by the clamp 16 so that the sealing zone 22 is in close fitting engagement with the inside pipe 12. For this purpose, the sealing zone 22 is provided with a pair of intersecting slots 24 disposed in offset end-to-end relationship. In the illustrative embodiment, only a single pair of intersecting slots is used. However, in certain embodiments it may be desirable to use two pairs of slots, with one pair disposed diametrically opposite the other pair.

The pair of intersecting slots 24 is shown in FIG. 1 before the sealing zone 22 is collapsed, i.e. before the diameter of the sealing zone is reduced by the force of the clamp 16. The pair of intersecting slots 24 comprises an outboard slot 26 is bounded by a pair of sidewalls 32 and 34 extending inwardly from the end of the outside pipe and terminating in a transverse inner end wall 36 within the overlap region 18. The sidewalls 32 and 34 are substantially parallel to each other and to the axis of the pipe 14 whereas the end wall 36 extends obliquely of the sidewalls at a small angle from perpendicularity. The inboard slot 38 is bounded by a pair of sidewalls 42 and 44 extending axially inwardly from an outer end wall 46 thereof to an inner end wall 48. The end wall 36 of slot 26 and the end wall 46 of slot 38 lie on substantially the same line, i.e. they are in substantial alignment with each other. Also, the adjacent sidewalls, namely sidewall 34 and sidewall 42 are in substantial alignment with each other. The slot 26 intersects the slot 38 between the corner formed by end wall 36 and sidewall 42 and the corner formed by end wall 46 and sidewall 34. These corners are detached from each other, at least over a portion of the pipe wall thickness as a result of the slot forming operation which will be described presently.

Figure 5:
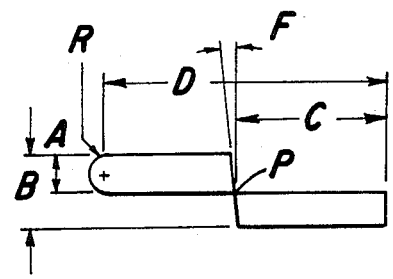
FIG. 5 shows the face of a punch for forming slots in one of the pipes.

The pair of intersecting slots 24 is formed in the end of pipe 14 by a punching operation. In the illustrative embodiment, the inside pipe 12 has a nominal outside diameter of one and three-fourths inches and the end of the outer pipe 14 is expanded to form a loose fit over the inside pipe. The wall thickness of the pipes is 0.048 inches. The punch for forming the pair of slots 24 coacts with a horn die inside the pipe end and has a shape corresponding to the slots as shown in FIG. 1. The punch face is shown in outline form in FIG. 5. The punch is constructed as two separate punch segments, one for each of the slots, and the segments are mounted for movement in unison to punch the slots in a single stroke. The puch dimensions for the illustrative embodiment are as follows: A=0.125 inches; B=0.250 inches; C=0.500 inches; D=0.938 inches; R=0.062 inches (radius) and F=4 degrees. The die is constructed to mate with the punch in accordance with conventional practice. As a result, the punching operation causes the punch-out material to break away from the pipe wall around the periphery of the slots so that the slot dimensions are slightly larger on the inside diameter than on the outside diameter. Since the die segments have point contact at the point P, the corners of the slots 26 and 38 will be spaced apart, at least on the inside diameter of the pipe and the slots thereby intersect and are open to each other.

The clamp 16 comprises a clamping band 52 which is disposed around the outer pipe 14 over the sealing zone 22. In particular, the clamping band 52, for sealing purposes, must cover the inboard slot 38 and cover the juncture of the end walls 36 and 46. The clamping band 52 is provided with a tightening means 54. The clamping band 52 is, for the most part, circular or roundish in cross-section. It has a roundish sector 56 adapted to fit around the sealing zone 22 on pipe 14 and a channel-shaped sector 58 which comprises a pair of sidewalls 62 and 64 extending radially outwardly from the roundish sector. The clamping band 52 is made of a single piece of sheet metal and each free end thereof is folded back on itself to form a double layer. Thus, the sidewalls 62 and 64 are of double thickness and terminate at their outer ends in respective loops or bights 66 and 68. The bights 66 and 68 serve as retaining members for holding the sidewalls in place when the tightening means 54 is tightened, as will be described subsequently.

The clamping band 52 is tightened around the pipe 14 by the tightening means 54. The tightening means comprises a reaction member or spline 72 which is disposed within the channel-shaped sector 58 and which is adapted to seat upon the outer surface of the sealing zone 22 of pipe 14. For this purpose, the spline has an inner surface of arcuate configuration conforming to the pipe 14. The spline 72 is provided with a pair of oppositely facing concave surfaces 74 and 76. The tightening means includes a bolt 78 and a nut 82. It also includes a spacer 84 disposed outside the sidewall 64 and having a convex surface which is opposite the concave surface 74 of the spline 72. The bolt 78 has a head 81 with a convex surface which is disposed outside the sidewall 64 opposite the concave surface 76 on the spline 72. The bolt extends through holes in the sidewalls 74 and 76, the spline 72 and the spacer 84.

Figure 2:
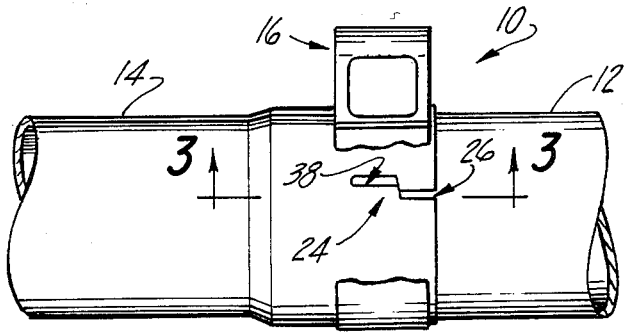
FIG. 2 shows the lap joint of this invention with the parts assembled and after the joint has been tightened.
Figure 3:
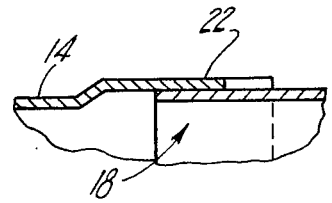
FIG. 3 is a view taken on lines 3—3 of FIG. 2.
Figure 4:
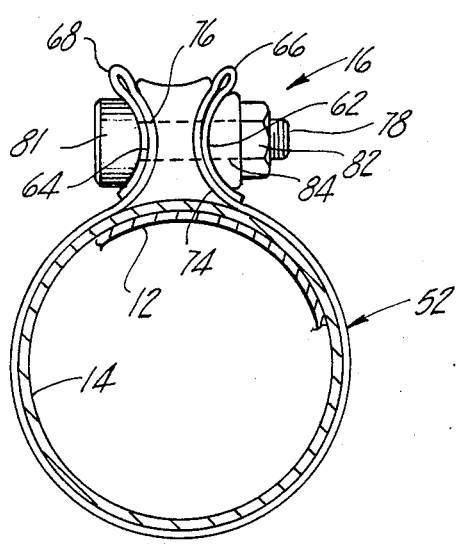
FIG. 4 is a view taken on lines 4—4 of FIG. 2.

When the pipe joint 10 is assembled and the nut 82 is tightened on the bolt 78, the relationship of the parts is as shown in FIGS. 2 and 4. It will be understood that, before the nut and bolt are tightened, the sidewalls 62 and 64 of the channel-shaped sector 58 are not seated against the spline 72. When the nut 82 is tightened, the bolt head 81 and the spacer 84 are drawn together and press the sidewalls 62 and 64 into seating engagement with the spline 72. As a result of this tightening action, the roundish sector 56 is stretched around the sealing zone 22 of the pipe 14 in tight engagement therewith. This tightening action of the clamp 16 exerts sufficient force on the sealing zone 22 to crush or collapse the sealing zone by partially closing the intersecting slots 24 with sliding engagement of the end walls 36 and 46 with each other. Thus, the sealing zone 22 is radially collapsed into sealing engagement with the inside pipe 12 and the clamp 16 is in sealing engagement with the sealing zone over the inboard slot 38. The engagement of the end walls 36 and 46 of the slots closes the path between the slots so that a good fluid seal of the joint is assured.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. In a coupling for a pipe lap joint of the type comprising:
    an inside pipe and an outside pipe in telescoping relationship to provide an overlap region on the end of each pipe, said overlap region on the outside pipe defining a circumferentially continuous area and at least one pair of axially extending slots, the first slot of each pair being disposed adjacent and through the end of said outer pipe and the second slot of each pair being spaced inwardly from the end of said outer pipe, a clamping band disposed around said outside pipe and covering said second slot, tightening means for clamping said band around said outside pipe to clamp the pipes together and collapse the overlap region of said outer pipe into close fitting engagement with said inner pipe to cause sealing engagement of said outer pipe with said inner pipe and with said band, the improvement wherein:
    said first slot has sidewalls extending axially inwardly from the end of said outside pipe and terminates in a transverse inner end wall within said overlap region, said second slot is circumferentially offset from said first slot and has sidewalls extending axially inwardly from an outer end wall, the adjacent sidewalls of said slots being in substantial alignment with each other and said end walls being in substantial alignment with each other,
    whereby said end walls of said slots are disposed in edge-to-edge engagement with each other when the overlap region of said outer pipe is collapsed into close fitting engagement with said inner pipe by clamping said band around said outside pipe.

2. The invention as defined in claim 1 wherein said end walls extend obliquely of said adjacent sidewalls.

3. The invention as defined in claim 1 wherein:
    said band is an open loop with its free ends extending radially outwardly,
    and said tightening means includes at least one bolt and nut extending through said free ends for drawing the ends together.

4. The invention as defined in claim 1 wherein:
    said band has a cross-section including a roundish sector and a radailly projecting channel-shaped sector,
    said channel-shaped sector comprises a pair of sidewalls extending outwardly from the roundish sector and being separated from each other at the outer ends to form an opening in the band,
    a spline disposed between the sidewalls and having a pair of surfaces which are respectively opposite said pair of sidewalls, one of said surfaces of said spline being concave,
    a bar disposed against one sidewall opposite said concave surface of the spline,
    said tightening means including at least one bolt and nut with the bolt extending laterally through the said bar, sidewalls and spline and being adapted to force the sidewalls against the respective surfaces of the spline, whereby the band is stretched around said overlap region.

5. The invention as defined in claim 4 wherein:
    said band comprises a single piece of sheet metal and each said sidewall is folded back on itself to provide a double layer of sheet metal.

* * * * *

UNITED STATES PATENT AND TRADEMARK OFFICE
CERTIFICATE OF CORRECTION

PATENT NO. : 4,629,226

DATED : December 16, 1986

INVENTOR(S) : Cassel et al

It is certified that error appears in the above-identified patent and that said Letters Patent is hereby corrected as shown below:

Title page, filing date:

Delete "Apr. 16, 1985" and insert -- Apr. 12, 1985 --.

Column 2, line 29, delete "with".

line 29, after "of" insert -- the --.

line 57, after "a" insert -- cross-sectional -- and delete "lines 4-4".

Column 3, line 9, "outise" should be -- outside --.

line 27, after "26" insert -- and an inboard slot 38. The outboard slot 26 --.

Signed and Sealed this

Eighteenth Day of October, 1988

*Attest:*

DONALD J. QUIGG

*Attesting Officer*          *Commissioner of Patents and Trademarks*